United States Patent [19]
Inoue et al.

[11] Patent Number: 4,484,298
[45] Date of Patent: Nov. 20, 1984

[54] METHOD AND DEVICE FOR GENERATION OF QUADRATIC CURVE SIGNAL

[75] Inventors: Tadanari Inoue; Takao Asaka; Yuji Yamaguchi, all of Tokyo, Japan

[73] Assignee: Yokogawa Hokushin Electric Corporation, Tokyo, Japan

[21] Appl. No.: 365,938

[22] Filed: Apr. 5, 1982

[30] Foreign Application Priority Data

Apr. 30, 1981 [JP]  Japan ................................ 56-65795
May 25, 1981 [JP]  Japan ................................ 56-78899

[51] Int. Cl.$^3$ ............................................. G06F 15/31
[52] U.S. Cl. .................................................. 364/720
[58] Field of Search .............................. 364/718, 720

[56] References Cited

U.S. PATENT DOCUMENTS

| | | | |
|---|---|---|---|
| 3,652,839 | 3/1972 | Maekawa et al. | 364/718 |
| 3,917,932 | 11/1974 | Saita et al. | 364/718 |
| 4,023,027 | 5/1977 | Strathman et al. | 364/720 |
| 4,272,808 | 6/1981 | Hartwig | 364/718 |
| 4,371,933 | 2/1983 | Bresenham et al. | 364/720 X |

OTHER PUBLICATIONS

McCrea, P. G., et al., "On Digital Differential Analyzer Circle Generation For Computer Graphics", *IEEE Transactions on Computers*, Nov. 1975, 1109–1110.

Suenaga, Y. et al., "A High-Speed Algorithm for the Generation of Straight Lines and Circular Arcs", *IEEE Transactions on Computers*, vol. C-28, No. 10, Oct. 1979, 728–736.

Jordan, Jr., B. W. et al., "An Improved Algorithm for the Generation of Nonparametric Curves", *IEEE Transactions on Computers*, vol. C-22, No. 12, Dec. 1973, 1052–1060.

Danielsson, P., "Incremental Curve Generation", *IEEE Transactions on Computers*, vol. C-19, No. 9, Sep. 1970, 783–793.

*Primary Examiner*—Joseph F. Ruggiero
*Assistant Examiner*—Clark A. Jablon
*Attorney, Agent, or Firm*—Moonray Kojima

[57] ABSTRACT

A method and system for generation of a quadratic curve signal expressed by $f(x, y) = 0$ nonparametrically on coordinates X, Y, wherein, when linear micro-coefficients in the directions x, y are points (x, y) are given as fx, fy, respectively, the signs of fx, fy are decided and fx, fy are compared for dimensions with each other, thereby limiting the point to be selected next, to two points; then the value of new f(x,y) obtainable through selecting each point, are calculated; absolute values of the new f(x, y) are compared, the point giving the smaller value being selected as the next point; and repeating the aforementioned procedure, thereby to generate a quadratic curve signal expressed by $f(x, y) = 0$.

2 Claims, 9 Drawing Figures

METHOD AND DEVICE FOR GENERATION OF QUADRATIC CURVE SIGNAL

BACKGROUND OF THE INVENTION

1. Field of the Invention

This invention relates to method and system for generation of a quadratic curve signal to be used effectively for expression of quadratic curves, including a straight line, in an aggregate of dots.

A display unit (e.g. plasma display unit and cathode ray tube (CRT) of a raster scan system) expressing patterns in an aggregate of dots and a digital plotter are used in electronic computer systems, as a pattern output device. In case a human being utilizes a computer in a conversational mode through a display unit, such as for example, in computer aid design (CAD), a high speed, accurate and easy to observe curve, must be generated on the CRT. More particularly, the present invention relates to method and system for generation of a quadratic curve signal, which satisfies such requirements. The curve herein disclosed refers to a conic curve, including a straight line.

2. Description of the Prior Art

One method for generating curves at high speed utilizes a device known as digital differential analyzer (DDA). This method is described in detail in IEEE Transaction on Computers, November 1975, P. 1109-1110, "On Digital Differential Analyzer Circle Generation for Computer Graphics" P. G. McCrea and P. W. Baker. However, according to the method described therein, generation of conic curves leaves open the possibility of producing large errors. Furthermore, disadvantageously, such a method precludes generating a curve at reasonably high speed and smoothly.

As an alternative from the foregoing method of generating parametric curves using the DDA method, a method for generating conic curves nonparametrically is disclosed, for example, in IEEE Transaction on Computers, September 1970, P. 783-793, "Incremental Curve Generation", Per E. Danielson; or in IEEE Transaction on Computers, December 1973, P. 1052-1960, "An Improved Algorithm for the Generation of Nonparametric curves",, Bernard W. Jordan, et. al.. Insofar as a straight line and circle are concerned, a simpler method is disclosed in IEEE Transaction on Computers, October 1979 P. 728-738, "A High Speed Algorithm for the Generation of Straight Lines and Circular Arcs", Yasuhito Suenaga etal.

The method disclosed by Jordan et al. is effective for generating curves which are accurate, smooth and superior in symmetricalness, in quadratic curve generation. However, that method has a shortcoming in that it requires a plurality of variable registers which involves a problem prone sequence and requires a large amount of time for processing, in the hardware carrying out the algorithm.

Thus, in the prior art, there exists a need for a simple and inexpensive method and system for generation of quadratic curves, which can be carried out readily by simple hardware and which improves upon the Jordan method, on the basis of an algorithm for the quadratic curve generation, suggested thereby.

Prior to describing the invention, the Jordan method of generating a quadratic curve will be described. FIG. 1 is an explanatory drawing of Jordan's method. FIG. 2 is a flow chart of the algorithm representing such method. In FIG. 1, there is shown the case wherein a circle is set forth as an example.

First, a two dimensional curve is given by the below expression (1).

$$f(x,y)=0 \tag{1}$$

Then, a derived function is given as below expressions (2) through (6).

$$fx = \frac{\partial f}{\partial x} \tag{2}$$

$$fy = \frac{\partial f}{\partial y} \tag{3}$$

$$fxx = \frac{\partial^2 f}{\partial x^2} \tag{4}$$

$$fxy = \frac{\partial^2 f}{\partial y \partial x} \tag{5}$$

$$fyy = \frac{\partial^2 f}{\partial y^2} \tag{6}$$

Assuming z=f(x, y), the curve f(x, y)=0, will be conceived to be an intersection with the plane x,y cut with three dimensional curves z=f(x, y) and z=0. Since values of x, y are discrete in the curve f(x, y)=0 which is expressed as a dot pattern, these do not aways appear on plane z=0, and value f(x, y) can be any of f(x, y)>0, =0, <0. Therefore, a dot pattern satisfying f(x, y)=0 approximately can be drawn by selecting lattice point coordinates of x, y in sequence, so that f(x, y) will be minimized.

The case wherein a circle is drawn, as an example of a quadratic curve, is shown in FIG. 1. Suppose the curve is drawn in the direction indicated by arrow from coordinates Ps. In FIG. 1, if the present spot is P, the point to move next will be either Px, Pxy or Py. However, in FIG. 1, the point present on the plane x, y is Ps only, and those points of P, Px, Pxy and Py are not always ones to appear on plane x, y. Now, if a distance from f(x, y) to f(x, y)=0, at point P is saved as $f^\alpha$, then the value f(x, y) at points Px, Pxy, Py, can be expressed by the below expressions (7) through (9).

$$f(x+\Delta x,y) \leftarrow f\alpha + fx \cdot \Delta x + \tfrac{1}{2}fxx(\Delta x^2) + \ldots \tag{7}$$

$$f(x,y+\Delta y) \leftarrow f\alpha + fy \cdot \Delta y + \tfrac{1}{2}fyy(\Delta y^2) + \ldots \tag{8}$$

$$f(x+\Delta x, Y+\Delta y) \leftarrow f\alpha + fx \cdot \Delta x + fy \cdot$$
$$\Delta y + \tfrac{1}{2}\{fxx(\Delta x)^2 + 2fxy(\Delta x)(\Delta y) + fyy(\Delta y)^2\} + \ldots \tag{9}$$

The above expressions (7) through (9) are calculated, then the absolute values $|f^X|$, $|f^Y|$, $|f^{XY}|$ are compared with each other, and then value f(x,y) is renewed as $f^\alpha$. Next, fx and fy are renewed in below expressions (10) and (11).

$$fx \leftarrow fx + fxx \cdot \Delta x + fxy \cdot \Delta y + \ldots \tag{10}$$

$$fy \leftarrow fy + fyx \cdot \Delta x + fyy \cdot \Delta y + \ldots \tag{11}$$

The circle is drawn by repeating the above operation until the end point.

FIG. 2 is a flow chart giving an algorithm according to the described Jordan method.

The Jordan method comprises selecting from the present spot, the next point, from among three points proposed therefor. However, disadvantageously, the hardware which is required to carry out this method, involves complex circuitry having a large number of variables.

Thus, the art still is deficient in a method and system for generating quadratic curves, which are simple, and inexpensive and which can be carried out with simple and inexpensive hardware.

SUMMARY OF THE INVENTION

Thus, an object of the invention is to overcome the aforementioned and other deficiencies and disadvantages of the prior art.

The present invention aims to simplify both the circuitry and control system for producing quadratic curve signals, by limiting the points to be selected next, to two points, and reducing further steps to a comparison of absolute values of the two numbers. When linear micro-coefficients in the directions x,y at points (x, y) are given at fx, fy, respectively, the points to be selected next, are limited to two points by comparing $|fx|$, $|fy|$ for dimensions, besides the signs of fx, fy. When each point is selected, new values $f(x, y)$ are obtained. Absolute values of the new $f(x, y)$ are compared with each other. Then, a point to give a smaller value is selected, as the next point. Thus, a quadratic curve signal of $f(x, y)=0$ is generated nonparametrically by repeating the above procedure.

DETAILED DESCRIPTION OF PREFERRED EMBODIMENT

Figure 1:
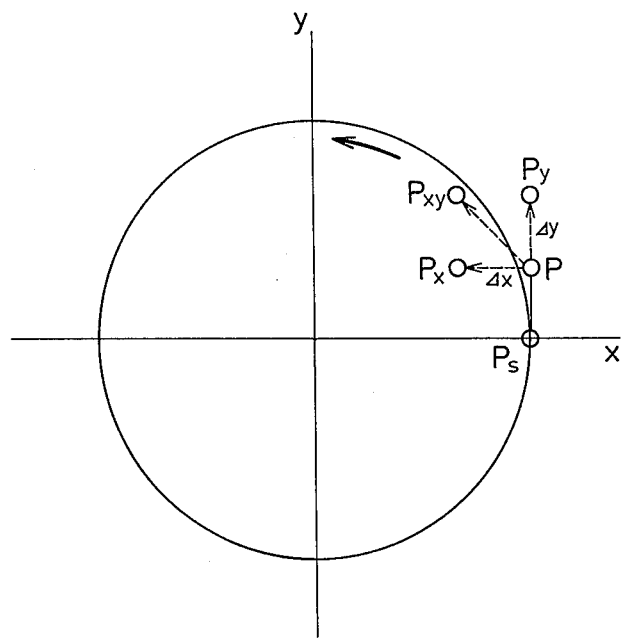
FIG. 1 depicts a method suggested by Jordan et al.
Figure 2:
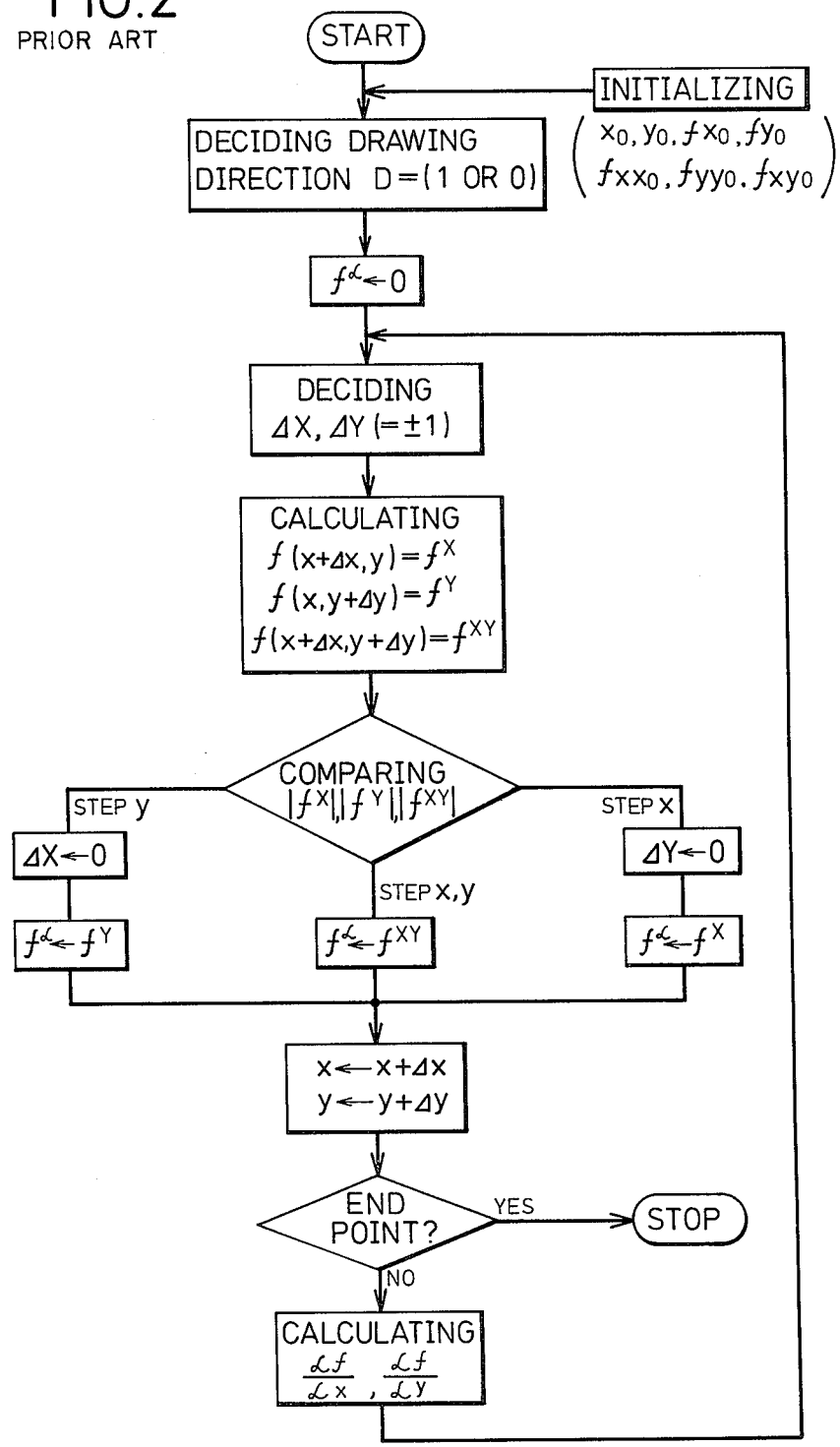
FIG. 2 depicts a flow chart representing an algorithm of the method of FIG. 1.
Figure 3:
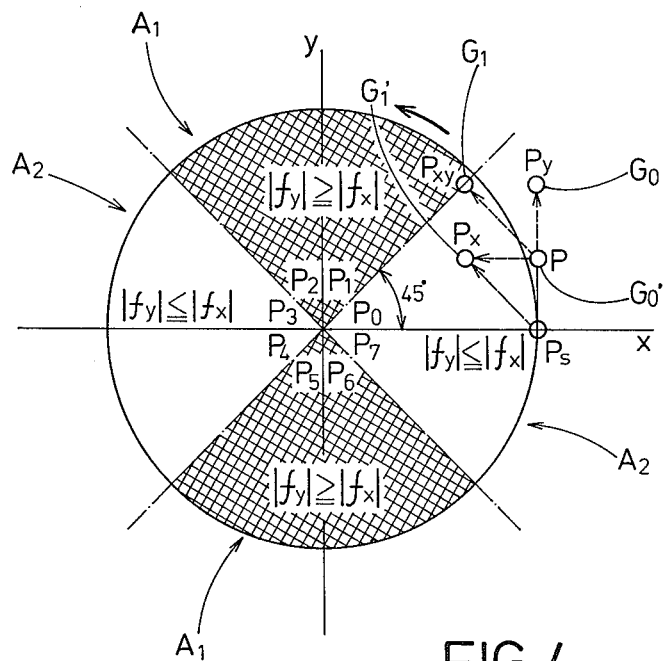
FIGS. 3 and 4, are explanatory drawings illustrating the case where a circle is drawn according the an illustrative method of the invention.
Figure 4:
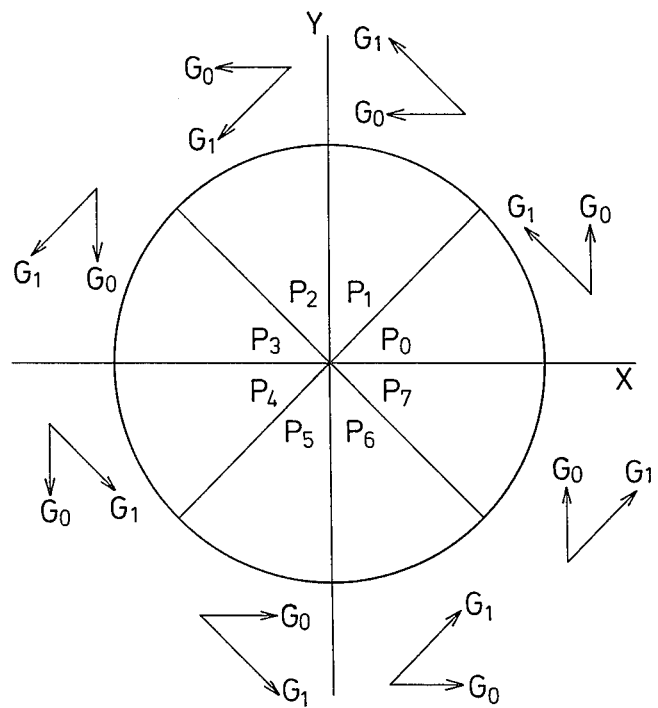
Figure 5:
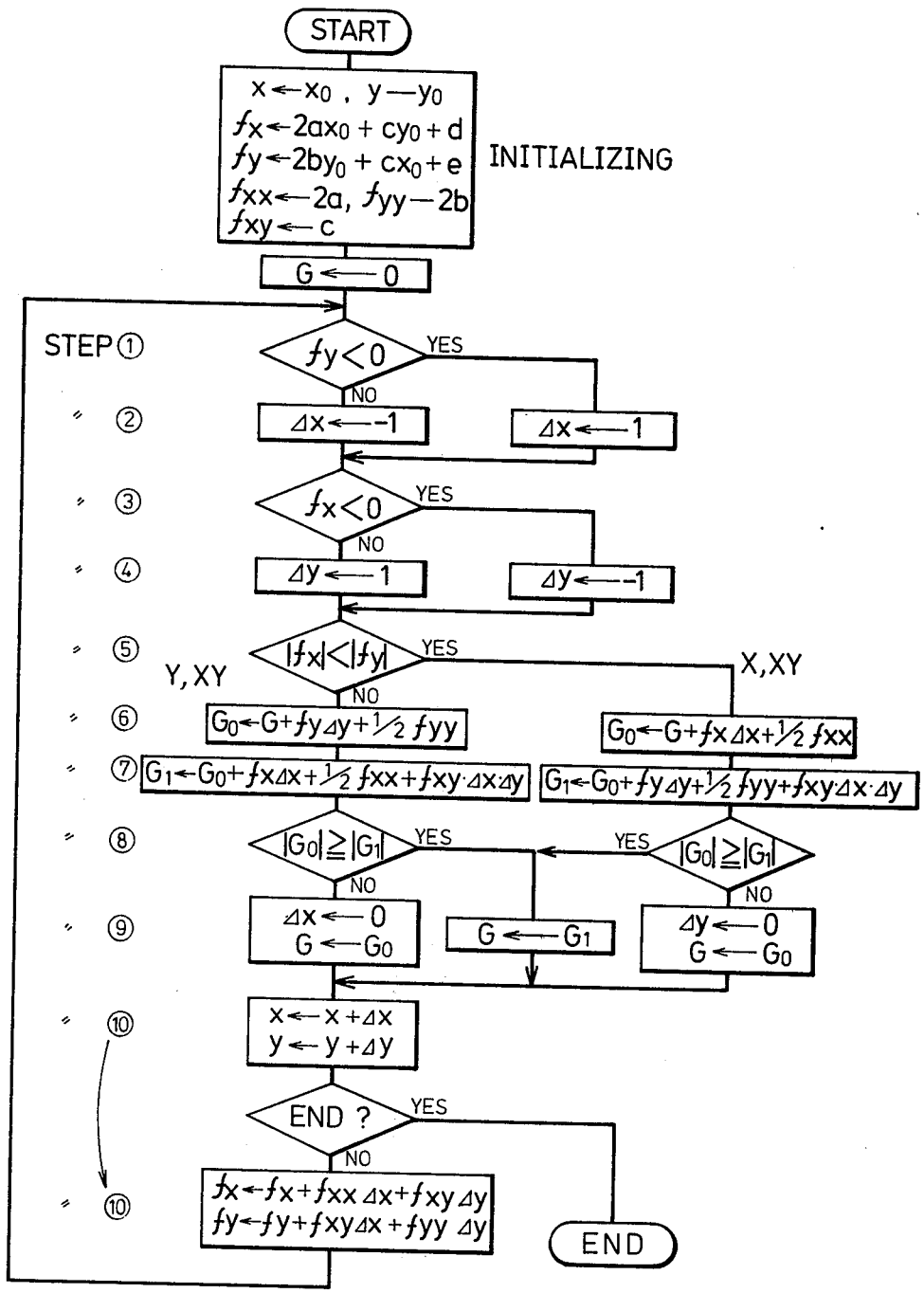
FIG. 5 depicts a flow chart representing an algorithm of the embodiment of FIGS. 3 and 4.

FIGS. 3 and 4 are explanatory drawings illustrating the case wherein a circle is drawn according to an illustrative method of the invention. FIG. 5 is a flow chart representing an algorithm of such method shown in FIGS. 3 and 4. In FIG. 3, linear micro-coefficients in the directions x, y at points (x, y) are given at fx, fy, respectively. The signs of the linear microcoefficients are decided first. Then, fx and fy are compared for dimensions. Then, the curves are divided into two domains $A_1$, $A_2$ of $|fy| \geq |fx|$ and $|fy| \leq |fx|$. The circle is then divided into 8 sectors $P_0$ through $P_7$, and the present point is decided for which 8 divided circle sector it belongs. In the flow chart of FIG. 5, steps ① to ⑤ show a flow for the decision.

In the 8 divided circle sectors $P_0$ through $P_7$, the point (direction) to select next is prepared in two points $G_0$, $G_1$ beforehand, in each part. The values $G_0$, $G_1$ of a new $f(x, y)$, when each point is selected, are obtained. Then, the absolute values $|G_0|$, $|G_1|$ of these values are compared with each other, and the smaller value is selected as the next point. Namely, in FIG. 5, step ⑥ indicates an operation for $G_0$ and step ⑦ for $G_1$. The absolute values $|G_0|$, $|G_1|$ are compared at step ⑧. The smaller one of $G_0$, $G_1$ is selected in step ⑨. Step ⑩ is for updating the point selected through the abovementioned steps as the present point. Then, the procedure returns to step ①, and the process is repeated until the end point is reached.

At a point P of FIG. 3, a process for selecting the next point will be described conceptually. As will be apparent from the drawing FIG. 3, a condition $|fx| > |fy|$ is realized in the domain $P_0$. The point P is not a starting point. Therefore, if coordinates of point P are (x, y), $z=f(x, y)=0$ is not always satisfied (not always appearing on the circle). Thus, it has a finite value other than zero. For the point to be selected next, $P_X$ is excluded in the domain $P_0$. Two points $G_1$, $G_0$ and $P_Y$ and $P_{XY}$ only are compared with each other. Then, point $G_1$, which will be a smaller value (a point coming close by the circle), is selected as the next point. Thus, each point (dot) can be made to come close and follow the circle by selecting the point coming next in sequence from the two points proposed, and thereby drawing the circle.

Figure 6:
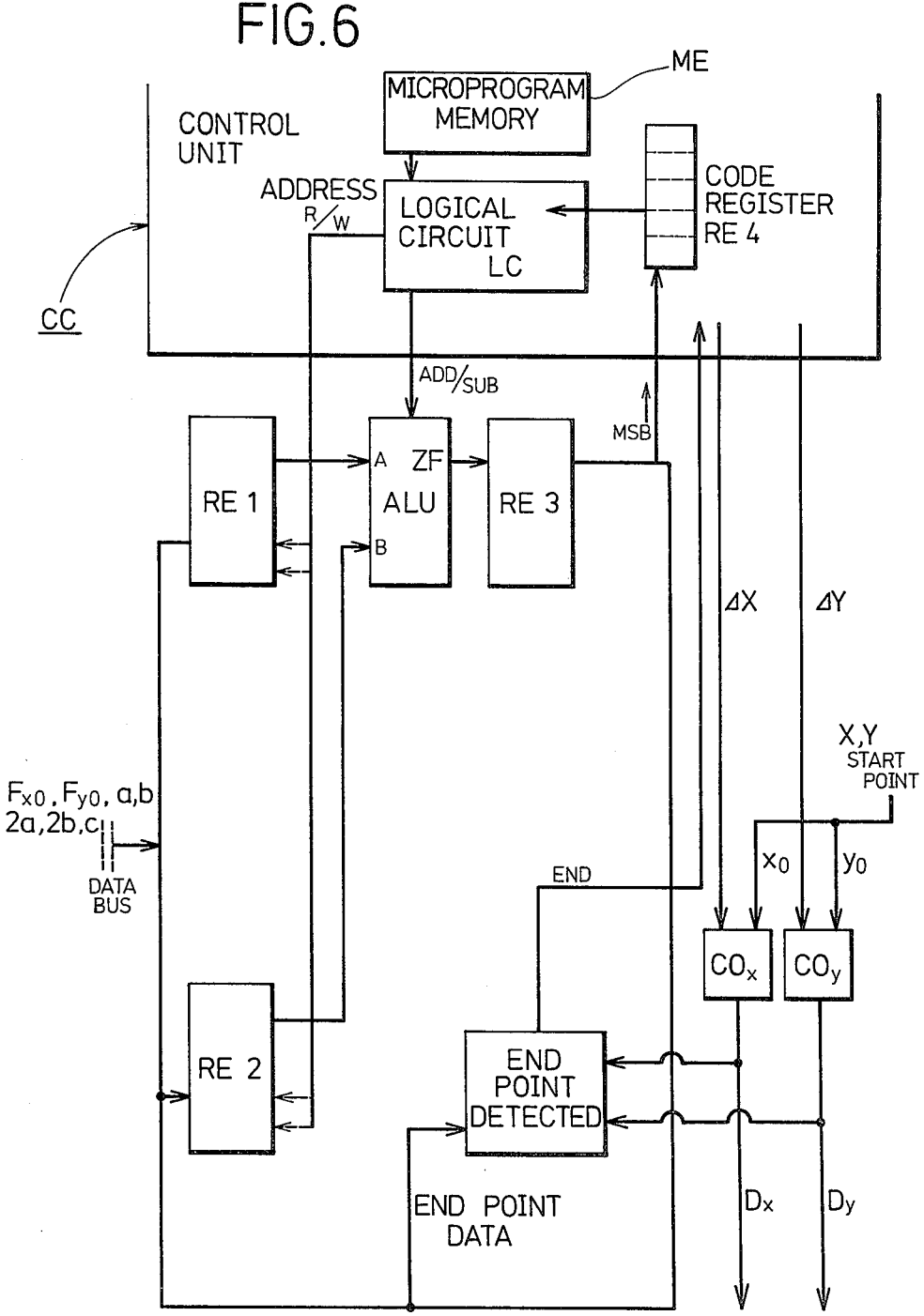
FIG. 6 depicts a block diagram representing one example of a system which carries out the inventive method.

FIG. 6 is a block diagram representing one example of a system for carrying out the method shown in FIGS. 3 and 4. In FIG. 6, RE1, RE2 are registers to store each coefficient and variable (fx, fy, $f^\alpha$, a, b, c, d, e), given each data through a data bus and capable of reading and writing independently each of them. ALU is an operator to input data from registers RE1, RE2 for addition and subtraction. RE3 is a latch circuit to hold, temporarily, an operation result transmitted from the operator ALU. The operation result is stored in registers RE1, RE2, by way of a bus line. $CO_X$, $CO_Y$ are updown counters for X coordinate and Y coordinate, respectively. Coordinates $x_o$, $y_o$ indicate the starting point first set there. The contents of the counter are updated thereafter according to the operation results. RE4 is a sign register to input the uppermost digit data (sign data) of the operation result outputted through latch circuit RE3. LC is a logic circuit to input a signal from the sign register RE4, which operates according to programs from a microprogram memory ME and gives an operation command signal to an arithmetic circuit ALU. CC is a control unit to supervise and control registers, latch circuit, updown counters $CO_X$, $CO_Y$, etc. Such circuit construction enables the operator to carry out the addition and subtraction in the main and thus is effective to accelerate the speed of operation.

A sequence for operation is stored in memory ME as a microprogram. By combination of an operation command of the microprogram and contents of the sign register RE4, the logic circuit LC commands the operator ALU to add or subtract, for example, contents of which address of REG1 and those of which address of REG2, and also to store the operation result thereat. A decision of the linear micro coefficient sign, a comparison of fx,fy for dimensions, and an operation for which direction to proceed, $G_1$ or $G_0$ are carried out thereby.

The operation result develops information on whether to proceed $\Delta X$ to $+1$ or $-1$, and $\Delta Y$ to $+1$ or $-1$, according to each domain and also to the direction $G_1$ or $G_0$, which is impressed on the updown counters $CO_X$, $CO_Y$. The updown counters $CO_X$, $CO_Y$ are updated consequently to data $D_X$, $D_Y$ to indicate x,y coordinate positions of the next point, and such data are outputted as a pattern generating signal. Such decision is made at every updating to the new point.

Figure 7:
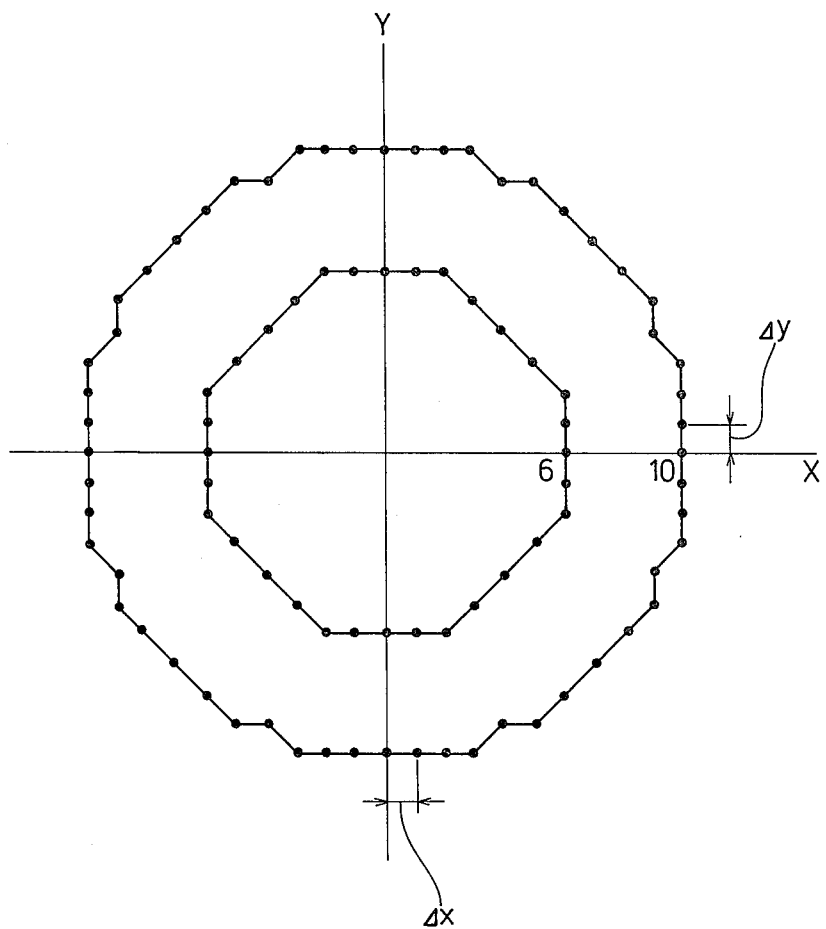
FIG. 7 depicts an example of a pattern obtained by drawing a circle according to the inventive method.

FIG. 7 represents an example of a pattern obtained through drawing circles of radiuses 6 and 10 on a CRT. ΔX, and ΔY are taken to be comparatively large for easy understanding, in this FIG. 7. However, the pattern can be more substantially approximated to a circle by using smaller ΔX and ΔY.

Next, in the inventive method and system for generating a quadratic curve signal nonparametrically, there will be described an end point setting of the quadratic curve signal and an algorithm for the decision.

In case the quadratic signal is generated nonparametrically, the end point of a quadratic curve is detected in the prior art generally by comparing end point coordinates (XE, YE) set beforehand directly with generation coordinates (X, Y) of the quadratic curve signal which was being outputted. Where the quadratic line is linear, in this case, the end point can be detected by deciding either one (selected by the angle normally) of X or Y. However, in the case of a circle, ellipse, parabola or other quadratic curve, it was necessary to detect a coincidence with the end point coordinates XE, YE set beforehand concurrently for both X,Y. The above prior art situation inevitably involved certain difficulties, such as in setting end point at an arbitrary position, and moreover, the algorithm or hardware for carrying out the process for decision became unduly complex.

In contrast, in the inventive system for generating a quadratic curve signal nonparametrically, the inventive system structure is such that the end point setting of the quadratic curve signal and the decision algorithm are substantially simplified. Namely, where micro-coefficients in the directions x,y at points (x, y) selected in sequence are given at $FX(=(\partial/\partial x)f(x, y))$ and $FY(=(\partial/\partial y)f(x, y))$, the signs at SFX, SFY, respectively, and for the end point coordinates (XE,YE) to set similarly, the microcoefficients are given at FXE, FYE and the signs at SFXE, SFYE, the conditions for end point detection are specified as $(X=XE)$  $(SFY=SFYE)$ at $|FX| \leq |FY|$     (12)

$(Y=YE)$  $(SFX=SFXE)$ at $|FX| > |FY|$     (13).

When the above conditions are satisfied, generation of the quadratic curve signal is stopped as having come to the end point.

Figure 8:
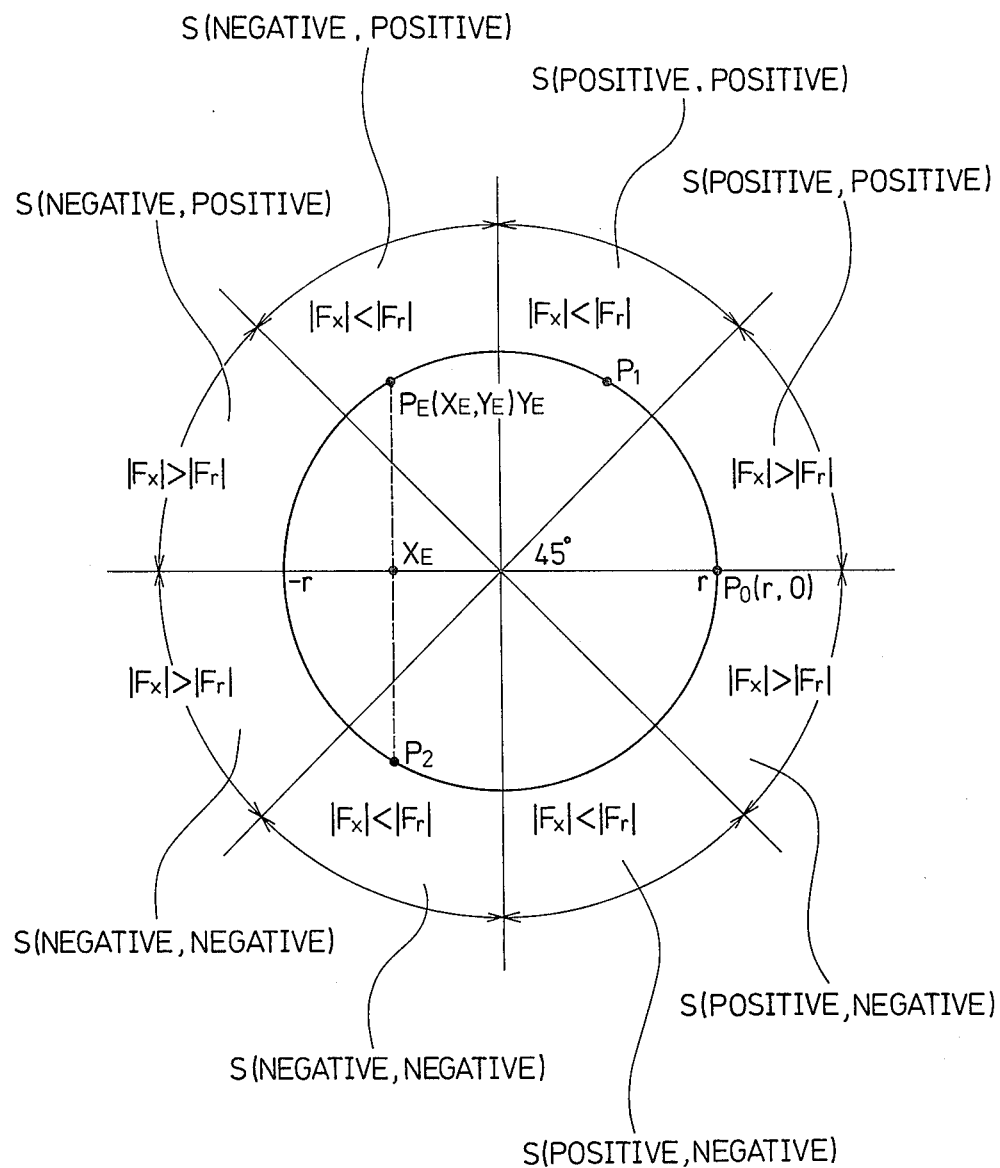
FIG. 8 is an explanatory drawing describing conception of an end point detection of a quadratic curve signal.

Next will be described the case wherein the quadratic curve is taken at $f(x, y) = x^2 + y^2 - r^2 = 0$ (i.e. a circle with the center (0,0) and radius r). FIG. 8 represents relation between FX, FY, SFX, SFY in this case. Micro-coefficients FX,FY in the directions x,y are $FX=2x$ and $FY=2y$, and SFX, SFY are expressed by S (positive or negative, positive or negative, respectively).

In case, for example, a quadratic curve signal indicating a circular arc to a point PE (XE, YE) counterclockwise from a point PO (r,0) is obtained, XE, YE (XE only acceptable actually in this case) and SFXE, SFYE are set beforehand for the end point PE as an end point coordinate information.

The process (that of drawing the circular arc), wherein the quadratic curve signal indicates the circular arc, is that of selecting the point to come next sequentially, from the point PO according to signs or dimensions of the slants (FX, FY) in the directions X,Y. The procedure described hereinbefore applies.

A decision on which expression to use, (12) or (13) given hereinbefore, for end point detecting conditions, depends on the information from the calculating process, wherein the point to come next is selected in sequence under the procedure. In the case of FIG. 8, for example, SFX<0, SFY>0, and $|FX|<|FY|$ at the point PE (XE, YE). Therefore, the end point is obtained when the conditions of expression (12) are satisfied. Namely, any decision will not be made for Y, YE, in this case, except the comparison of X with XY (subtraction of both signals or coincidence detection by exclusive OR (EX-OR)), and the point PE can be detected through discriminating point P1 from P2 in FIG. 8.

In generating a quadratic curve signal other than a circle, the criterion of the above mentioned expressions (12) and (13) applies for the end point detection. This is because, when a pattern signal is generated according to information of FX,FY, the common situation is such that it proceeds in the direction $|FX|$ or $|FY|$, whichever is smaller, fundamentally. When $|FX|>|FY|$, a dot string is given transversely (X direction) but longitudinally (Y direction) when $|FX|>|FY|$. Therefore, X,Y are determined on the spot to XE or YE in such section. Then, where a setting of XE, YE includes an error more or less reversely, the end point will be detected always in such section.

Figure 9:
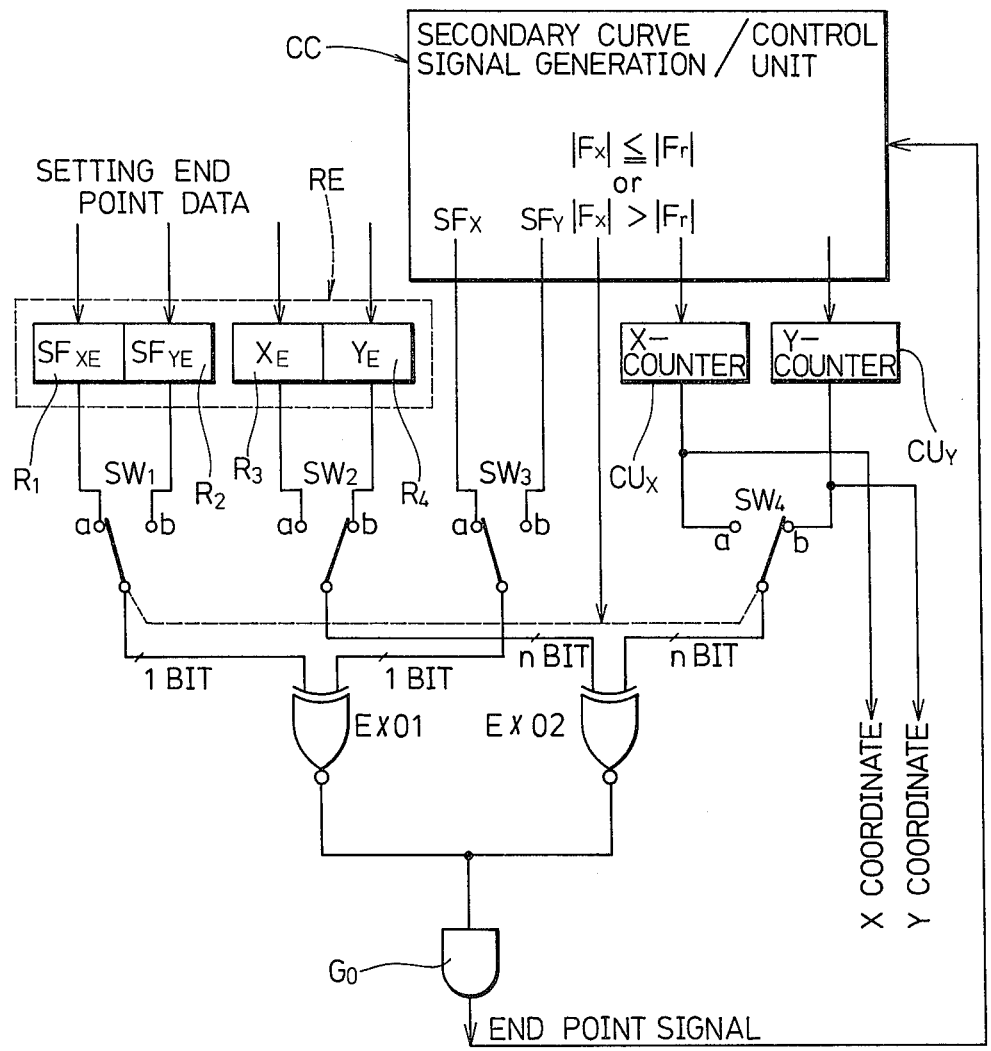
FIG. 9 depicts a block diagram representing one example of a circuit for detecting an end point.

FIG. 9 is a block diagram representing one example of a circuit for end point detection. In FIG. 9, RE denotes an end point register, to set end point data, or end point coordinates XE, YE and signs SFXE, SFYE of the end point micro-coefficients, which comprise 4 individual registers $R_1$ through $R_4$. CC represents a quadratic curve signal generation unit and a control unit generally, comprising a plurality of registers, adder/-subtractor, microprocessor, etc, which are not illustrated particularly therein. A quadratic curve signal is generated according to signs or dimensions of the quadratic curve slant (linear micro-coefficients FX,FY). CUX, CUY denote X counter and Y counter which are connected to the quadratic curve signal generation unit CC, and X coordinate and Y coordinate data indicating the quadratic curve signal are outputted thereat.

SW1 through SW4 represent data selectors driven on a signal outputted according to the status of $|FX| \leq |FY|$ or $|FX| > |FY|$ from the control unit CC. The data selector SW1 switches an output signal of registers $R_1$, $R_2$. The data selector SW2 switches an output signal of registers $R_3$ and $R_4$. The data selector SW3 switches sign data SFX, SFY of the linear microcoefficients obtained through the quadratic curve signal generation unit CC. The data selector SW4 switches an output signal from X counter CUX and Y counter CUY. EXO1 represents a coincidence detection circuit to detect a coincidence of signals from the data selectors SW1, SW3. EXO2 represents a coincidence detection circuit to detect a coincidence of data signals from the data selectors SW2, SW4. An exclusive OR circuit is used for both foregoing circuits. Go then represents a gate circuit to input signals from each coincidence detection circuits EXO1, EXO2.

In such circuit configuration, each data selector SW1 through SW4, is driven to a contact a or b, as shown in below TAble 1, according to dimensions of the quadratic curve slant (linear microcoefficients FX, FY) obtained at the quadratic curve signal generation unit CC.

TABLE 1

|  | SW1 | SW2 | SW3 | SW4 |
|---|---|---|---|---|
| $\|FX\| \leq \|FY\|$ | b | a | b | a |
| $\|FX\| > \|FY\|$ | a | b | a | b |

The connection shown in FIG. 9 represents the case wherein $|FX| > |FY|$, and the end point is detected according to conditions given in expression (13). Namely, under the condition $|FX| > |FY|$ at quadratic curve signal generation unit CC, a value Y of the coordinate Y outputted to the Y counter CUY coincides with a value YE of the end point coordinate set on the end point register R$_4$, and whether or not SFX value (1 bit) coincides with a sign SFXE of the end point micro-coefficient set on the end point register R$_1$, is detected on each coincidence detection circuit EXO$_1$, EXO$_2$. When both coincide, the point is detected as an end point. An end signal from the gate circuit Go is given to quadratic curve signal generation unit CC. Thus, an output of the quadratic curve signal is stopped.

As described, according to the system illustrated in FIG. 9, the end point can be detected accurately by detecting a coincidence of a sign of the end point micro-coefficient with a value of either X coordinate or Y coordinate. Therefore, an algorithm for the decision is simple. Also, a circuit for end point detection can be simplified. When a comparison is made for both the coordinates X,Y in this connection, a comparator of $n+n=2n$ (n being coordinate bit number) will be required. However, a comparator of $n+1$ bits is enough to work according to this method.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A system for generating a quadratic signal, comprising
   at least two registers to store a coefficient and variable;
   an arithmetic circuit to operate for addition and subtraction of signals from said registers and to store the operation result in said registers;
   a sign register to input data relevant to a sign of said operation result from said arithmetic circuit;
   a logic circuit to give an operation indicating signal to said arithmetic circuit through a combination of a signal from said sign register with a microprogram indicating a given operation sequence;
   two updown counters given data of X coordinate position and Y coordinate position to indicate a start point at first and updating the data in sequence according to information from said arithmetic circuit;
   a circuit means to give data to said two updown counters from said arithmetic circuit,
   logic for deciding signs of linear micro-coefficients fx,fy in the directions of x and y on the quadratic curve $f(x,y)=0$ or at points (x,y) close to said curve,
   logic for comparing fx,fy for dimensions,
   logic for calculating new f(x, y) for two points G$_o$ and G$_1$, having determined a point G to select next beforehand,
   logic for comparing absolute values of the two points G$_o$, G$_1$ of the new f(x,y),
   logic for selecting from points G$_o$, and G$_1$, the point giving the smaller absolute value as the next point;
   and end point detection circuit means to detect points selected in sequence as an end point upon satisfying the following conditions, thereby producing said quadratic curve signal expressed by $f(x,y)=0$, from said two updown counters, $$(X=XE) \quad (SFY=SFYE) \text{ at } |FX| \leq |FY|$$

$$(Y=YE) \quad (SFX=SFXE) \text{ at } |FX| > |FY|$$

wherein micro-coefficients for x,y at points (x,y) selected in sequence are FX,FY; the signs are SFX, SFY; and micro-coefficients for x, y at end points (XE,YE) set beforehand are FXE, FYE, and the signs are SFXE, SFYE.

2. The system of claim 1, wherein said end point detection circuit means comprises an end point register to set end point data (XE,YE,SFXE,SFYE); a coordinate counter on which coordinate data (X,Y) of said points selected in sequence are set; a first data selector to switch said end point data SFXE,SFYE from said end point register; a second data selector to switch said end point data XE,YE; a third data selector to switch sign data SFX, SFY of micro-coefficients of coordinate data outputted from said output means; a fourth data selector to switch coordinate data X,Y from said coordinate counter; a first coincidence detection circuit to detect a coincidence of a signal from said first data selector with a signal from said third data selector; a second coincidence detection circuit to detect a coincidence of a signal from said second data selector with a signal from the fourth data selector, said first to fourth data selectors being driven according to dimensions of micro-coefficients FX, FY of the coordinate data outputted from said output means.

* * * * *